Figure 1:
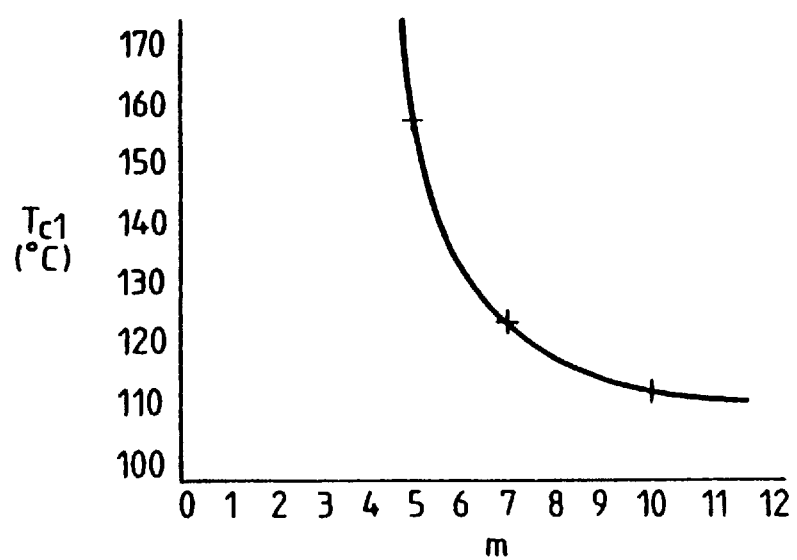

United States Patent [19]
McDonnell et al.

[11] Patent Number: 5,866,038
[45] Date of Patent: Feb. 2, 1999

[54] LIQUID CRYSTAL POLYACRYLATES

[75] Inventors: Damien Gerard McDonnell; Jennifer Margaret Blackmore, both of Malvern; David Coates, Poole; Elizabeth Narborough, Poole; Mark Andrew Verrall, Poole, all of England

[73] Assignee: The Secretary of State for Defence in her Britannic Majesty's Government of the United Kingdom of Great Britain and Northern Ireland, United Kingdom

[21] Appl. No.: 455,251

[22] Filed: May 31, 1995

Related U.S. Application Data

[63] Continuation of Ser. No. 255,893, Jun. 7, 1994, abandoned, which is a continuation of Ser. No. 877,761, May 4, 1992, abandoned and a continuation of PCT/GB91/01074, Jul. 2, 1991, published as WO92/00366, Jan. 9, 1992.

[30] Foreign Application Priority Data

Jul. 2, 1990 [GB] United Kingdom .................. 9014688

[51] Int. Cl.$^6$ .......................... C09K 11/20; C09K 19/12; C08F 118/02; C08F 222/10
[52] U.S. Cl. ................................ 252/299.67; 252/299.64; 252/299.65; 252/299.66; 524/544; 526/318; 526/31 P; 526/245; 526/246; 526/292.1
[58] Field of Search .................. 252/299.01, 299.64, 252/299.65, 299.66, 299.67; 526/318, 319, 242, 245, 246, 292.1, 292.4; 524/544

[56] References Cited

U.S. PATENT DOCUMENTS

| | | | |
|---|---|---|---|
| 4,709,100 | 11/1987 | Hermolin et al. ...................... | 568/639 |
| 4,717,757 | 1/1988 | Dubois et al. .......................... | 526/246 |
| 4,904,066 | 2/1990 | Gray et al. .......................... | 252/299.01 |
| 4,973,373 | 11/1990 | Hashimoto et al. ...................... | 428/1 |
| 4,983,318 | 1/1991 | Matsumoto et al. ................ | 252/299.01 |
| 5,034,153 | 7/1991 | Uchida et al. ...................... | 252/299.65 |
| 5,151,217 | 9/1992 | Price ........................................ | 252/312 |
| 5,190,686 | 3/1993 | Uchida et al. ...................... | 252/299.01 |
| 5,200,108 | 4/1993 | Yuasa et al. ........................ | 252/299.01 |
| 5,518,652 | 5/1996 | Parri et al. .......................... | 252/299.01 |
| 5,645,760 | 7/1997 | Yamada et al. ...................... | 252/299.66 |
| 5,720,900 | 2/1998 | Parri et al. .......................... | 252/299.66 |

FOREIGN PATENT DOCUMENTS

| | | |
|---|---|---|
| 0 228 703 | 7/1987 | European Pat. Off. . |
| 0 241 338 | 10/1987 | European Pat. Off. . |
| 0 188 785 | 7/1988 | European Pat. Off. . |
| 2 632 648 | 12/1989 | France . |
| 63-273608 | 11/1988 | Japan . |
| 01-234413 | 9/1989 | Japan . |
| WO 90/00584 | 1/1990 | WIPO . |

OTHER PUBLICATIONS

"Thermotropic LC Polymers with Mesogenic Side Groups" Shibaev et al in Advances in Polymer Sci. Edited by Gordon, 1984.

Caplus 1990: 119626.

Shibaev et al., "Synthesis and sructure of liquid–crystalline side–chain polymers", Pure & Appl. Chem. vol. 57, No. 11, pp. 1589–1602, 1985.

*Primary Examiner*—Shean C. Wu
*Attorney, Agent, or Firm*—Nixon & Vanderhye

[57] ABSTRACT

There is disclosed a liquid crystal polyacrylate mono- or co-polymers having a repeat unit (I), wherein $R_1$ and $R_2$ are independently alkyl or hydrogen, $R_3$ is alkyl, hydrogen or chlorine, m is 0 or an integer 1–20, W is a linkage group COO, OOC or O and X is a mesogenic group.

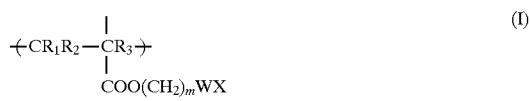

9 Claims, 1 Drawing Sheet

LIQUID CRYSTAL POLYACRYLATES

CROSS-REFERENCE TO RELATED APPLICATIONS

This is a continuation of application Ser. No. 08/255,893, now abandoned, filed Jun. 7, 1994 which is a continuation of 07/877,621 filed May 4, 1992, now abandoned. This application is a continuation of PCT/GB91/01074 filed Jul. 2, 1991 and published as WO 92/00366 on Jan. 9, 1992.

This invention relates to a novel method for preparation of liquid crystal polyacrylates and to some novel liquid crystal polyacrylates prepared using this method.

Liquid crystal polyacrylates are a generally known type of liquid crystal polymer ("LCP"). LCP's are known and are used in the electro-optical device industry, for example in optical storage devices, in non-linear optical devices and in pyroelectric devices, see for example GB 2146787 A and Makromol Chem (1985) 186 2639–47.

One known type of LCP consists of a polymeric backbone to which are attached laterally pendant side chains which have a chemical structure that is mesogenic, ie that induces liquid crystalline character, these being known as side chain liquid crystal polymers. Work in this field has identified a large number of types of side chain structures which are suitable, see for example GB 2146787 A. For some purposes it is desirable that the LCP shows a smectic C (Sc) or chiral smectic C (Sc*) liquid crystal phase, and a particularly preferred side chain for achieving this is one which contains laterally fluorinated biphenyl or terphenyl system.

In liquid crystal polyacrylates the backbone consists of a polyacrylate, e.g. polymethacrylate chain with pendant side chains, ie of general structure:

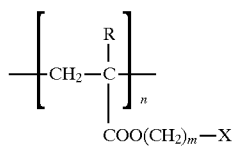

Where $(CH_2)_m$—X is the side chain and R is hydrogen or alkyl in the case of polyalkylacrylates, being methyl in polymethacrylates. Such liquid crystal polyacrylates are known, e.g. as described in Polymer Communications (1988) 24 364–365. In Makromol. Chem. Rapid Commun. (1984) 5 393–398 chloroacrylic liquid crystal polymers are described having a general structure:

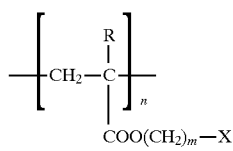

in which R is methyl or chlorine, the latter being said to favour Sc phases.

Synthesis of such liquid crystal polyacrylates has proven difficult, and there is a need for an improved method of synthesis. It is believed that these difficulties arise from the attachment of the spacer $(CH_2)_m$ into the acrylate ester monomer of the polyacrylate too early in the synthesis, and the invention seeks to alleviate these difficulties in part at least by the provision of a novel method of attachment of such a spacer group into suitable acrylate ester monomers.

According to this invention, a method for the preparation of a polyacrylate mono- or co-polymers having a repeat unit I:

wherein $R_1$ and $R_2$ are independantly alkyl or hydrogen, $R_3$ is alkyl, hydrogen or chlorine, m is 0 or an integer 1–20, W is a linkage group COO, OOC, O, and X is a mesogenic group, comprises polymerising an acrylate ester monomer of formula II:

The preferences expressed below are with respect inter alia to ease of preparation and usefulness in preparing liquid crystal polyacrylates by polymerisation of these acrylate esters.

Preferably $R_1$ and $R_2$ are hydrogen. Preferably $R_3$ is hydrogen, chlorine or methyl. m is 0 or an integer 1–20. Preferably m is 5–15, especially 10 or 11. Lower m values are believed to result in desirable higher clearing points.

The method is suitable for a wide variety of mesogenic groups X, e.g. groups X which can be expressed by a general formula III:

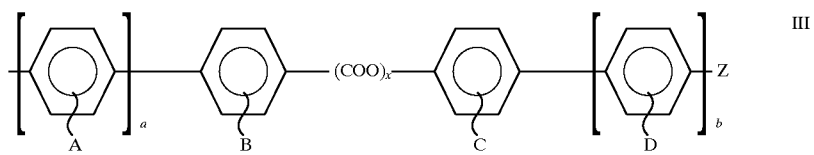

in which a, b and x are independently 0 or 1, A, B, C and D are independently methyl, chlorine or fluorine, and Z is cyano, halogen, —R, —OR, —OOCR, —COOR, or —(CO)$_p$O *CH (CH$_3$)COOR, where * indicates an asymmetric centre and R is $C_1$-15 alkyl which may itself contain an asymmetric centre which may be halogen substituted or methylated, and p is 0 or 1.

Preferred groups X for preparation of liquid crystal polyacrylates which are expected to show an Sc or Sc* phase are fluorobiphenyl and terphenyl systems, ie of general formula IIIA:

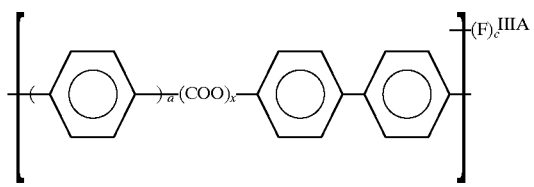

in which a and x are 0 or 1, c is 1 to 4 and the fluorine substituents may occupy any of the substitution positions on the two or three rings.

Especially preferred structures for groups of formula IIIA are listed below:

IIIA 1 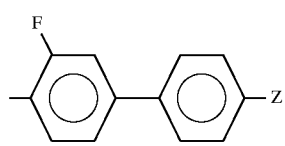

IIIA 2 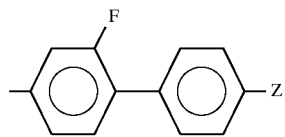

IIIA 3 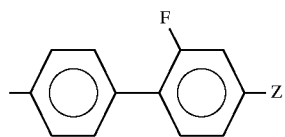

IIIA 4 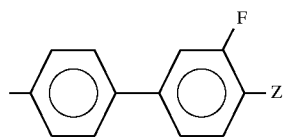

IIIA 5 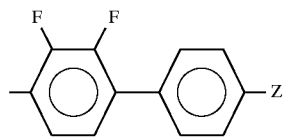

IIIA 6 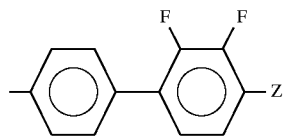

IIIA 7 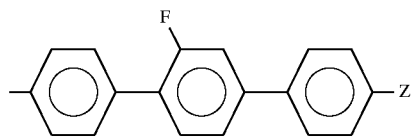

IIIA 8 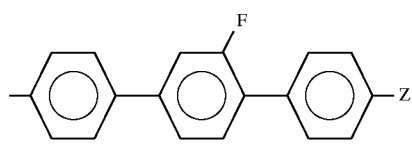

IIIA 9 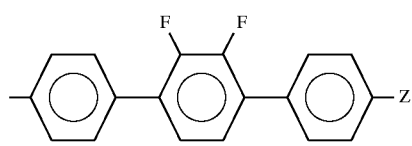

IIIA 10 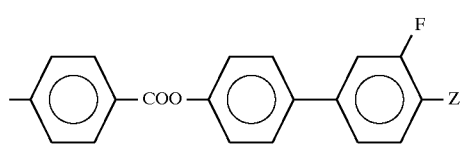

IIIA 11 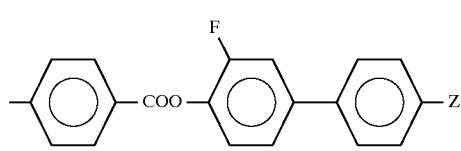

-continued

IIIA 12 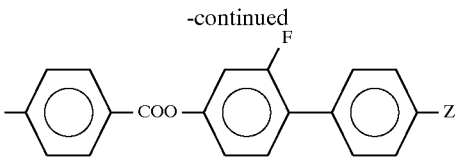

IIIA 13 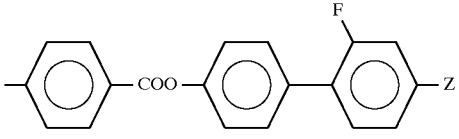

For the formation of Sc phases preferred groups Z in formula IIIA are $C_3$–$C_{12}$ —OR where R is n-alkyl. For Sc* phases —OR or —COOR where R is asymmetrically substituted alkyl especially 2-methyl alkyl such as 2-methylheptyl, lactate ester e.g. —OCH*($CH_3$)COOR, with or without halogen substitution such as

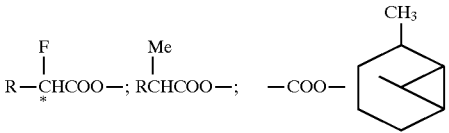

particularly with R as ethyl groups are preferred for Z.

The polymerization reaction may be carried out using known methods of preparing polyacrylates from acrylate ester monomers, but it is preferred to react the acrylate ester monomer with a catalyst azo-iso-butyronitrile (AIBN) in a solvent, preferably dichloroethane, toluene or especially dichloromethane, as it is believed the latter may lead to a higher molecular weight polymer product. Other free radical initiator catalysts may also be used in place of AIBN, and it may be useful to irradiate or heat the reaction mixture during the polymerization reaction.

Acrylate esters of formula II above may be prepared by reacting a compound of formula IV:

$$Y—(CH_2)_m—COOX \quad\quad\quad IV$$

where Y is bromine or iodine, with an acrylic acid sodium or potassium salt of formula:

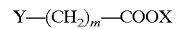

where M is sodium or potassium.

It is preferred to carry out the reaction between the compound of formula IV and the acrylic acid salt at room temperature (ca. 20° C.) in a suitable solvent, preferably hexamethyl phosphoramide (HMPA). The acrylate salt may itself be prepared by reaction of the corresponding acid $R_1R_2C=CR_3COOH$ with the metal hydride MH, e.g. NaH in the same solvent, hydrogen being evolved. Preferably a 1.1:1.0 excess of the acid to the hydride is used.

In a preliminary synthetic stage, the compound of formula IV may be prepared by esterification of a suitable phenol HO—X, with an acid of formula Y—$(CH_2)_m$—COOH, e.g. in a solvent such as dichloromethane using trifluoroacetic anhydride (TFAA) as a catalyst. Phenols of formula HO—X are known or may be prepared by methods apparent to those skilled in the art, for example by treatment of known phenylboronic acids with hydrogen peroxide (see M F Hawthorne J Org Chem (1957) 22 1001). Examples of methods by which such boronic acids can be prepared are given in GB 8905422A.

Acrylate esters of formula II and the polyacrylate polymer are believed to be novel. Those having a group X of formula III, in particular of formulae IIIA and the sub-variants of this IIIA 1–IIIA 14 are expected to be of particular value in providing Sc and/or Sc* liquid crystal polyacrylates. In such polyacrylates those in which $R_3$ is chlorine might be expected to show a greater tendency to form Sc phases than their counterparts with $R_3$ as hydrogen or alkyl.

The invention will now be illustrated by way of non-limiting examples, with reference to FIG. 1 which shows the effect of varying the spacer length m on the clearing point, ie the temperature at which the polymer becomes an isotropic liquid.

Using the method outlined above the polyacrylate polymer:

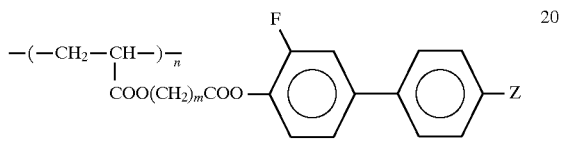

was prepared for a number of groups Z using the reactions:

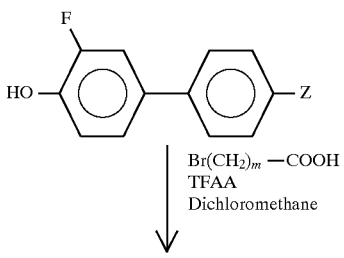

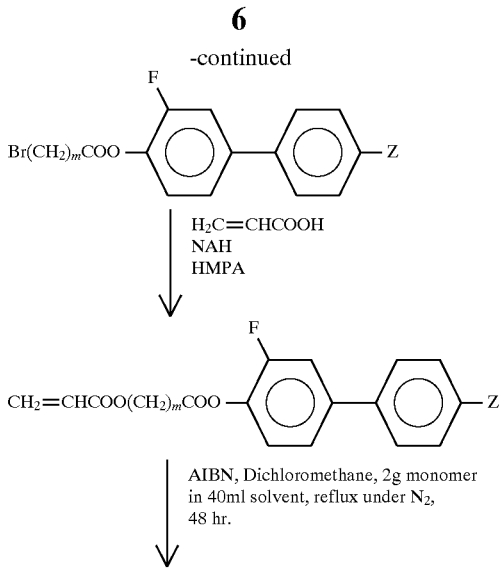

The following asymmetrically substituted fluorobiphenyl polyacrylates were synthesised. The differential scanning colorimetry (DSC) temperatures indicate phase transitions.

| POLYMER | DSC TRANSITION TEMP/°C. | MICROSCOPIC EXAMINATION |
|---|---|---|
| CH₂ / CHCOO(CH₂)₁₀COO—[biphenyl-F]—O2*octyl | 2.7, 28.2 | Sandy texture No phases identifiable |
| CH₂ / CCH₃COO(CH₂)₁₀COO—[biphenyl-F]—O2*octyl | Tg 0.8? | No phases identifiable |
| CH₂ / CCH₃COO(CH₂)₁₀COO—[biphenyl-F]—OLACT* | Tg 10.2 cp 6.3° | |

2*octyl = 2-methylheptyl
*Lact = OC*H(CH₃)COOC₂H₅

To investigate the effect of pendant chain length on the transition temperatures of polymers, the following polyacrylate was synthesised with three different spacer chain lengths:

CH₂ / CHCOO(CH₂)₁₀COO—[biphenyl-F]—OC₃H₁₇-n

| III | DSC TRANSITION TEMP/°C. | MICROSCOPIC EXAMINATION |
|---|---|---|
| 5 | 108.9, 157.4 | $S_A$ — Focal conic texture |
| 7 | 46.7, 67.2, 123.7 | $S_A$ |

7

-continued $$\begin{array}{c} | \\ CH_2 \\ | \\ CHCOO(CH_2)_{10}COO \end{array} - \bigcirc - \bigcirc^{F} - OC_8H_{17}\text{-n}$$  5

| III | DSC TRANSITION TEMP/°C. | MICROSCOPIC EXAMINATION |
|---|---|---|
| 10 | 47.4, 95.4, 111.9 | $S_A$ visible |

These results show that as m increases there is a corresponding decrease in the clearing point. The effect of m on the clearing point Tcl is shown graphically in FIG. 1.

All of the polyacrylates prepared above were polymerised using dichloroethane as solvent which tends to produce polymer chains about 9–40 repeat units long. To investigate the effect of using toluene a sample of the polymer:

8

$$\begin{array}{c} | \\ CH_2 \\ | \\ CHCOO(CH_2)_7COO \end{array} - \bigcirc - \bigcirc^{F} - OC_8H_{17}\text{-n}$$

was prepard by polymerisation in dichloromethane, dicloroethane and toluene as solvents.

| SOLVENT | DSC TRANSITION TEMPS/°C. |
|---|---|
| Dichloroethane | 46.7, 67.2, 123.7 (cp) |
| Dichloromethane | 156 (cp) |
| Toluene | 41.6, 60.6, 113.1 (cp) |

The transition temperatures are lower in toluene, suggesting that the two polymers differ in molecular weight.

The following polyacrylate polymers were also prepared using the method of this invention:

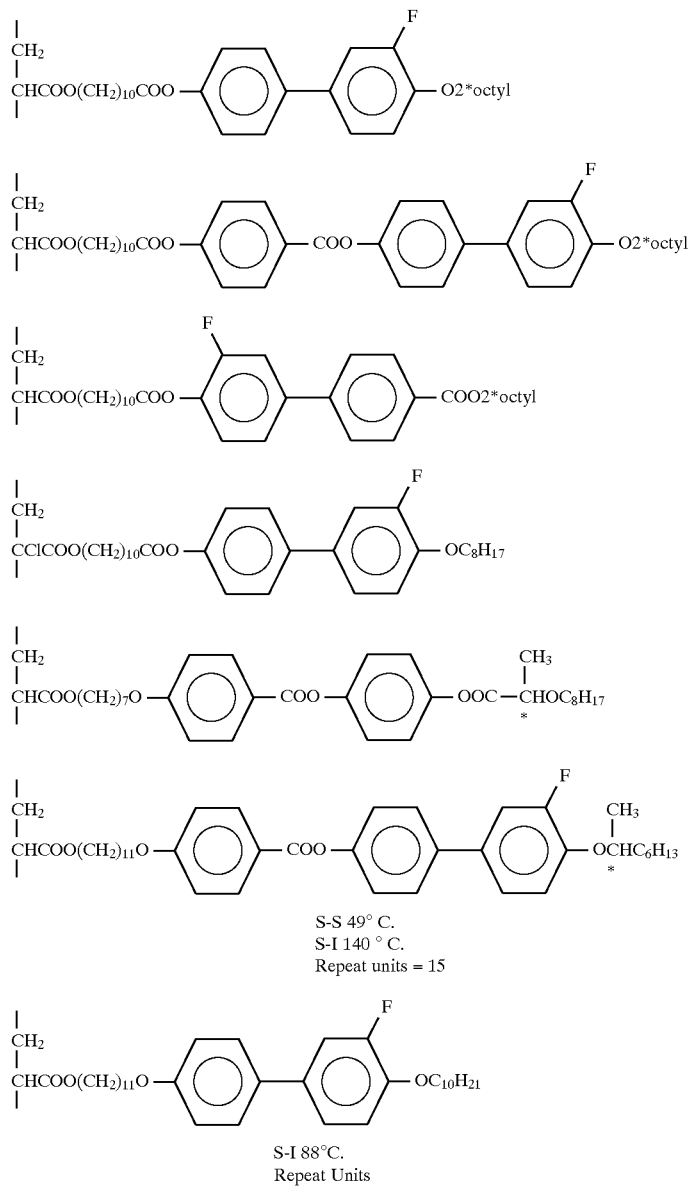

S-S 49° C.
S-I 140 ° C.
Repeat units = 15

S-I 88°C.
Repeat Units

-continued
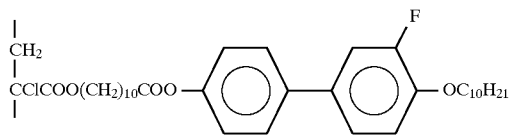
S-I 139° C.
Repeat Units = 11
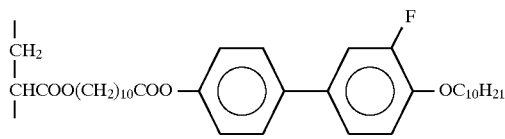
$S_1$–$S_2$ 88° C.
$S_2$–$S_3$ 117° C.
$S_3$-SI 147° C.
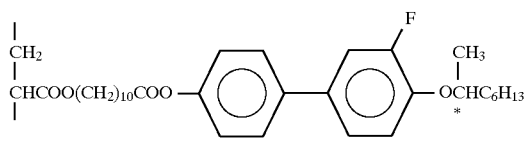
S-I 61° C.
Repeat Units = 11
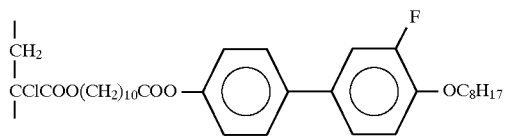
Sc-I 137° C.
Repeat Units = 37
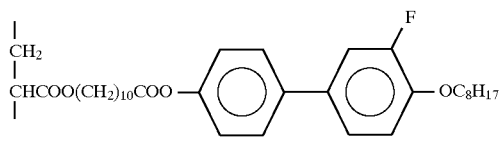
$S_I$-Sc 47° C.
Sc-$S_A$ 95° C.
$S_A$-I 112° C.
Repeat Units = 10
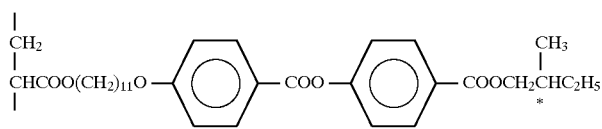
Tg-7
S-I 84° C.
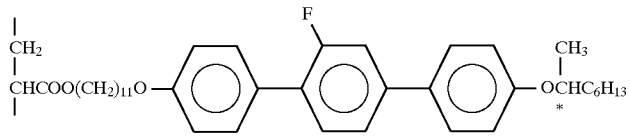
S-I 127° C.
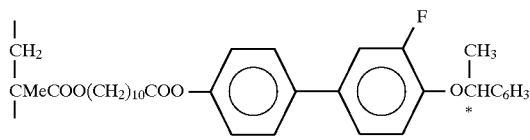
Sc-I 46° C.
Repeat Units = 12

The following polyacrylate copolymers were also prepared using the method of this invention.

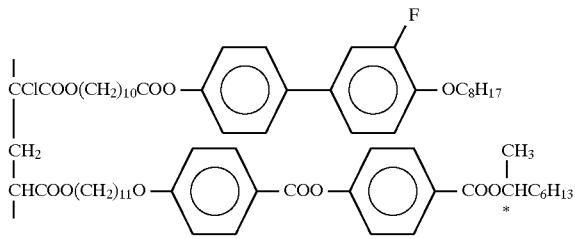

S-I 116° C.
Repeat Units = 14

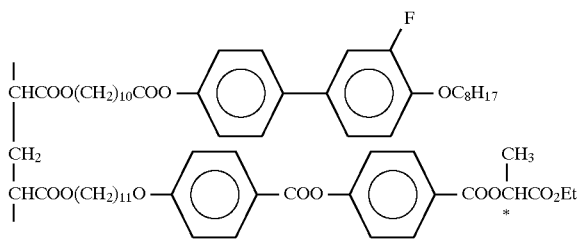

S-S 39°C.
S-I 94° C.
Repeat Units = 10

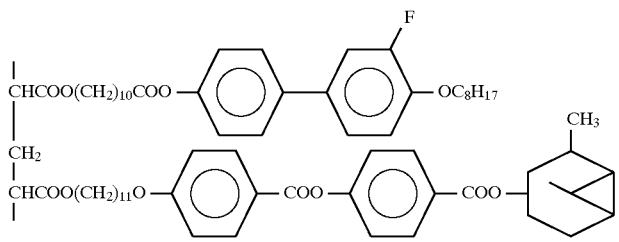

S-S 39° C.
S-I 97° C.
Repeat Units = 9

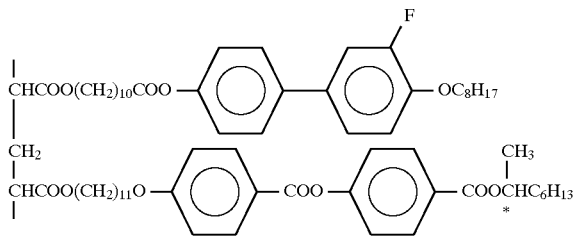

S-S 37° C.
S-I 76° C.
Repeat Units = 10

We claim:

1. A liquid crystal polyacrylate homo- or copolymer having a repeat unit I:

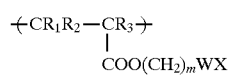

wherein $R_1$ and $R_2$ are independently alkyl or hydrogen; $R_3$ is alkyl, hydrogen or chlorine; m is an integer 1–20; W is a linkage group COO, OOC or oxygen; and X is a mesogenic group of formula III

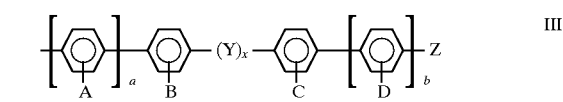

wherein a, b and x are independently 0 or 1; Y is COO, OOC, $CH_2O$; or $OCH_2$; A, B, C and D are independently methyl, chlorine, fluorine or hydrogen; Z is cyano, halogen, —R, —OR, —OOCR, —COOR, or —$(CO)_pO*CH(CH_3)COOR$, where * indicates an asymmetric center and R is $C_{1-15}$ alkyl, including alicyclic $C_{1-15}$ alkyl, which may itself contain an asymmetric center which may be halogen substituted or methylated or $CF_3$ substituted; and p is 0 or 1; when Z is OOCR then R may also be C(H)(R")OR' wherein R" is a $CH_3$ or $CF_3$ and R' is $C_{1-12}$ straight chain alkyl;

provided that there is at least one fluorine present on at least one of the phenyl rings;

provided that when formula I is a copolymer a=0, B=H, W is oxygen, x=1, Y=$CO_2$, C=H, b=1 and D=F then Z does not equal CN;

provided that when formula I is a copolymer a=0, B=H, W is oxygen, x=1, Y=$CO_2$, C=F, b=0 then Z does not equal CN, and further provided that when formula I is a homopolymer then Z is a group selected from R, OR, OOCR, —COOR wherein R is chiral $C_{1-15}$ alkyl including alicyclic $C_{1-15}$ alkyl which may itself contain an asymmetric center which may be halogen substituted or methylated for $CF_3$ substituted, provided that when there is an alkyl substituent on the chiral center then R is chiral $C_{2-15}$ alkyl; Z may also be selected from —(CO)$_p$O*CH($CH_3$)COOR where * indicates an asymmetric center and R is $C_{1-15}$ alkyl, including alicyclic $C_{1-15}$ alkyl, which may itself contain an asymmetric center which may be halogen substituted or methylated or $CF_3$ substituted; and p is 0 or 1; when Z is OOCR then R may also be C(H)(R")OR' wherein R" is a $CH_3$ or $CF_3$ and R' is $C_{1-12}$ straight chain alkyl wherein R" and R' are different and when Formula I is a copolymer then at least one of the Z groups present is chiral and is selected from the same Z groups when formula I is a homopolymer.

2. The liquid crystal polyacrylate homo or co-polymer according to claim 1 in which the Z groups are —OR where R is $C_{3-12}$ in which case the polymer is a copolymer or —OR or COOR where R is asymmetrically substituted alkyl.

3. The liquid crystal polyacrylate homo or co-polymer according to claim 1 in which Z is —OCH($CH_3$)COOR, RCH($CF_3$)COO—, ROCH($CF_3$)COO—, ROCH($CH_3$)COO—, RCH(Cl)COO—, RCH(F)COO—, RCH(Me)COO—, or

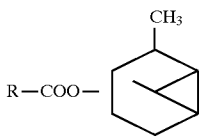

4. The liquid crystal polyacrylate homo or copolymer according to claim 1 in which the mesogenic group X is a fluorobiphenyl or terphenyl system of formula IIIA:

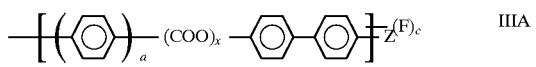

wherein a and x are 0 or 1, c is 1 to 4 and the fluorine substituents may occupy any of the substitution positions on the two or three rings; provided that if a=0 then x=0.

5. The liquid crystal polyacrylate homo or copolymer according to claim 4 in which the mesogenic group X is of formula IIIA1 to IIIA6:

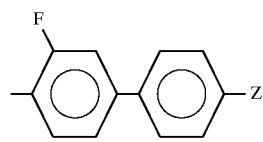

IIIA1

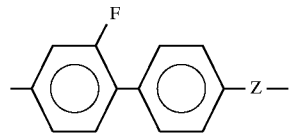

IIIA2

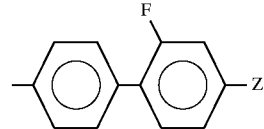

IIIA3

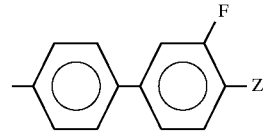

IIIA4

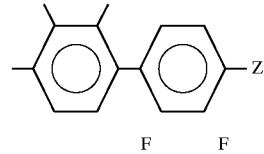

IIIA5

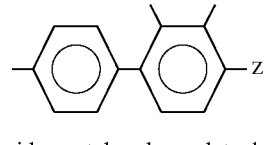

IIIA6

6. The liquid crystal polyacrylate homo or copolymer according to claim 4, in which the mesogenic group X is of formula IIIA7 to IIIA9:

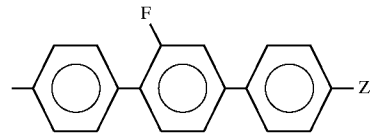

IIIA7

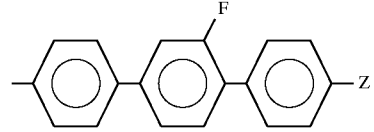

IIIA8

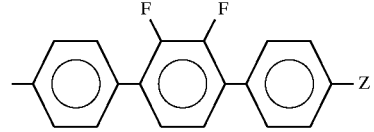

IIIA9

7. The liquid crystal polyacrylate according to claim 1 in which the mesogenic group X is of formula IIIA10 to IIIA13:

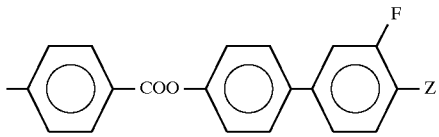

IIIA10

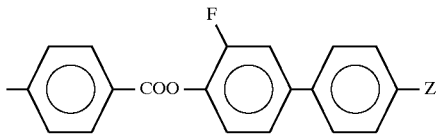

IIIA11

-continued
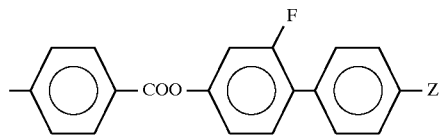
IIIA12
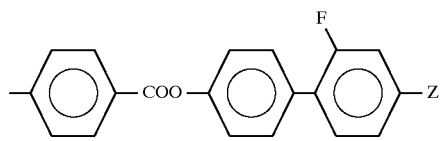
IIIA10
8. The liquid crystal polyacrylate homo or copolymer according to claim 2 in which R is 2-methylheptyl.
9. The liquid crystal polyacrylate homo or copolymer according to claim 3 where R is ethyl.
* * * * *